United States Patent
Citti et al.

(10) Patent No.: US 9,796,630 B2
(45) Date of Patent: *Oct. 24, 2017

(54) REFRACTORY OBJECT, GLASS OVERFLOW FORMING BLOCK, AND PROCESS OF FORMING AND USING THE REFRACTORY OBJECT

(71) Applicant: SAINT-GOBAIN CERAMICS & PLASTICS, INC., Worcester, MA (US)

(72) Inventors: Olivier Citti, Wellesley, MA (US); Andrea L. Kazmierczak, Marlborough, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/873,427

(22) Filed: Oct. 2, 2015

(65) Prior Publication Data

US 2016/0060172 A1    Mar. 3, 2016

Related U.S. Application Data

(63) Continuation of application No. 13/436,575, filed on Mar. 30, 2012, now Pat. No. 9,174,874.

(Continued)

(51) Int. Cl.
*C04B 35/10* (2006.01)
*C04B 35/101* (2006.01)
(Continued)

(52) U.S. Cl.
CPC ............ *C04B 35/10* (2013.01); *C03B 17/064* (2013.01); *C04B 35/1015* (2013.01);
(Continued)

(58) Field of Classification Search
CPC . C04B 35/101; C04B 35/1015; C03C 17/064; C03B 17/064
See application file for complete search history.

(56) References Cited

U.S. PATENT DOCUMENTS

| | | | |
|---|---|---|---|
| 3,378,385 A | 4/1968 | McCreight et al. | |
| 3,519,448 A | 7/1970 | Alper et al. | |
| (Continued) | | | |

FOREIGN PATENT DOCUMENTS

| | | |
|---|---|---|
| CN | 1210838 A | 3/1999 |
| CN | 1835897 A | 9/2006 |
| (Continued) | | |

OTHER PUBLICATIONS

International Search Report from PCT/US2012/033409 dated Mar. 4, 2013, 1 page.

(Continued)

*Primary Examiner* — Karl Group
(74) *Attorney, Agent, or Firm* — Abel Law Group, LLP; Adam Keser

(57) ABSTRACT

A refractory object can include at least 10 wt % $Al_2O_3$. Further, the refractory object may contain less than approximately 6 wt % $SiO_2$ or may include a dopant that includes an oxide of Ti, Mg, Ta, Nb, or any combination thereof. In an embodiment, at least approximately 1% of the $Al_2O_3$ in the refractory object can be provided as reactive $Al_2O_3$. In another embodiment, the refractory object may have a density of at least approximately 3.55 g/cc, a corrosion rate of no greater than approximately 2.69 mm/year, or any combination of the foregoing. In a particular embodiment, the refractory object can be used to form an Al—Si—Mg glass sheet. In an embodiment, the refractory object may be formed by a process using a compound of Ti, Mg, Ta, Nb, or any combination thereof.

18 Claims, 5 Drawing Sheets

Related U.S. Application Data

(60) Provisional application No. 61/469,502, filed on Mar. 30, 2011.

(51) Int. Cl.
*C03B 17/06* (2006.01)
*C04B 35/111* (2006.01)
*C04B 35/117* (2006.01)
*C04B 35/443* (2006.01)
*C04B 35/626* (2006.01)

(52) U.S. Cl.
CPC ........... *C04B 35/111* (2013.01); *C04B 35/117* (2013.01); *C04B 35/443* (2013.01); *C04B 35/62665* (2013.01); *C04B 2235/3206* (2013.01); *C04B 2235/3231* (2013.01); *C04B 2235/3232* (2013.01); *C04B 2235/3251* (2013.01); *C04B 2235/3262* (2013.01); *C04B 2235/3272* (2013.01); *C04B 2235/3281* (2013.01); *C04B 2235/3418* (2013.01); *C04B 2235/3463* (2013.01); *C04B 2235/3813* (2013.01); *C04B 2235/3839* (2013.01); *C04B 2235/5409* (2013.01); *C04B 2235/5436* (2013.01); *C04B 2235/5445* (2013.01); *C04B 2235/5472* (2013.01); *C04B 2235/77* (2013.01); *C04B 2235/9692* (2013.01)

(56) References Cited

U.S. PATENT DOCUMENTS

| | | |
|---|---|---|
| 3,652,307 A | 3/1972 | Bakker |
| 3,808,013 A | 4/1974 | Manigault |
| 3,844,803 A | 10/1974 | Blanke et al. |
| 3,879,210 A | 4/1975 | LaBar |
| 3,953,563 A | 4/1976 | Kihlstedt et al. |
| 4,018,965 A | 4/1977 | Kerko et al. |
| 4,093,470 A | 6/1978 | Cherry |
| 4,117,055 A | 9/1978 | Alexanderson |
| 4,290,814 A | 9/1981 | Pavlica et al. |
| 4,595,665 A | 6/1986 | Takayama et al. |
| 4,735,926 A | 4/1988 | Ando et al. |
| 5,061,526 A | 10/1991 | Robyn et al. |
| 5,076,815 A | 12/1991 | Kunz et al. |
| 5,137,853 A | 8/1992 | Ichikawa et al. |
| 5,322,826 A | 6/1994 | Becker et al. |
| 5,326,512 A | 7/1994 | Stillwagon et al. |
| 5,403,795 A | 4/1995 | Koyama et al. |
| 5,733,830 A | 3/1998 | Endo et al. |
| 5,795,363 A | 8/1998 | Pecoraro et al. |
| 5,830,819 A | 11/1998 | Shikata et al. |
| 5,856,254 A | 1/1999 | Feige et al. |
| 6,054,186 A | 4/2000 | Bonsall, III |
| 6,077,801 A | 6/2000 | Zanoli et al. |
| 6,117,807 A | 9/2000 | Virkar et al. |
| 6,143,678 A | 11/2000 | Yamamoto et al. |
| 6,158,248 A | 12/2000 | Beppu |
| 6,159,885 A | 12/2000 | Mizuno et al. |
| 6,362,120 B1 | 3/2002 | Fukushima |
| 6,383,963 B1 | 5/2002 | Yamamoto et al. |
| 6,417,127 B1 | 7/2002 | Yamamoto et al. |
| 6,753,284 B2 | 6/2004 | Yamamoto et al. |
| 6,812,177 B2 | 11/2004 | Ishino |
| 7,148,167 B2 | 12/2006 | Shikata et al. |
| 7,335,617 B2 | 2/2008 | Boussant-Roux et al. |
| 7,648,732 B2 | 1/2010 | Ott et al. |
| 7,767,292 B2 | 8/2010 | Djuricic et al. |
| 7,939,458 B2 | 5/2011 | Nakamura et al. |
| 8,092,928 B2 | 1/2012 | Schofalvi et al. |
| 8,138,109 B2 | 3/2012 | Takenami et al. |
| 8,187,990 B2 | 5/2012 | Avedikian et al. |
| 9,073,773 B2 * | 7/2015 | Citti ................ C03B 17/064 |
| 9,174,874 B2 * | 11/2015 | Citti ................ C04B 35/1015 |
| 9,249,043 B2 * | 2/2016 | Citti ................ C04B 35/111 |
| 2001/0019992 A1 | 9/2001 | Gaubil et al. |
| 2002/0103070 A1 | 8/2002 | Toshihiro |
| 2002/0172871 A1 | 11/2002 | Schucker |
| 2003/0078156 A1 | 4/2003 | Lowden |
| 2003/0109372 A1 | 6/2003 | Hasegawa et al. |
| 2003/0110804 A1 | 6/2003 | Fenn et al. |
| 2005/0186469 A1 | 8/2005 | De Jonghe et al. |
| 2006/0172879 A1 | 8/2006 | Boussant-Roux et al. |
| 2006/0293162 A1 | 12/2006 | Ellison |
| 2007/0015655 A1 | 1/2007 | Avedikian et al. |
| 2007/0154762 A1 | 7/2007 | Schucker |
| 2007/0203013 A1 | 8/2007 | Harmuth |
| 2008/0047300 A1 | 2/2008 | Rhoads |
| 2008/0269042 A1 | 10/2008 | Carty |
| 2009/0062106 A1 | 3/2009 | Avedikian et al. |
| 2009/0131241 A1 | 5/2009 | Godard et al. |
| 2009/0233784 A1 | 9/2009 | Schofalvi et al. |
| 2010/0056358 A1 | 3/2010 | Teratani et al. |
| 2010/0068492 A1 | 3/2010 | Boussant-Roux et al. |
| 2010/0084016 A1 | 4/2010 | Aitken et al. |
| 2010/0087307 A1 | 4/2010 | Murata et al. |
| 2010/0089098 A1 | 4/2010 | Citti et al. |
| 2010/0151232 A1 | 6/2010 | Cabodi et al. |
| 2010/0159226 A1 | 6/2010 | Suchanek et al. |
| 2010/0179051 A1 | 7/2010 | Citti et al. |
| 2010/0212359 A1 | 8/2010 | Godard et al. |
| 2010/0251774 A1 | 10/2010 | Peterson |
| 2010/0298109 A1 | 11/2010 | Takenami et al. |
| 2011/0021340 A1 | 1/2011 | Schofalvi et al. |
| 2011/0236743 A1 | 9/2011 | Kumar et al. |
| 2011/0251042 A1 | 10/2011 | Araki et al. |
| 2011/0283742 A1 | 11/2011 | Alasia |
| 2012/0006059 A1 | 1/2012 | Dejneka et al. |
| 2012/0006069 A1 | 1/2012 | Kim et al. |
| 2012/0096822 A1 | 4/2012 | Raffy |
| 2012/0164540 A1 | 6/2012 | Park et al. |
| 2012/0180528 A1 | 7/2012 | Ketcham et al. |
| 2012/0216566 A1 | 8/2012 | Ishino et al. |
| 2012/0227445 A1 | 9/2012 | Citti et al. |
| 2012/0260696 A1 | 10/2012 | Citti et al. |
| 2012/0263929 A1 | 10/2012 | Citti |
| 2013/0217563 A1 | 8/2013 | Citti et al. |
| 2015/0274568 A1 * | 10/2015 | Citti ................ C03B 17/064 65/195 |

FOREIGN PATENT DOCUMENTS

| | | |
|---|---|---|
| CN | 101124173 A | 2/2008 |
| CN | 101367665 A | 2/2009 |
| CN | 101687711 A | 3/2010 |
| CN | 101774749 A | 7/2010 |
| DE | 3029784 A1 | 2/1981 |
| DE | 3725170 A1 | 2/1989 |
| DE | 112006003321 A5 | 10/2008 |
| EP | 0010834 A1 | 5/1980 |
| EP | 0242769 A2 | 10/1987 |
| EP | 0701979 A1 | 3/1996 |
| EP | 0818259 A1 | 1/1998 |
| EP | 0850897 A1 | 7/1998 |
| EP | 0887324 A1 | 12/1998 |
| EP | 1288177 A1 | 3/2003 |
| EP | 2407441 A2 | 1/2012 |
| FR | 2392946 A1 | 12/1978 |
| GB | 454599 A | 10/1936 |
| GB | 618248 A | 2/1949 |
| GB | 960384 A | 6/1964 |
| GB | 1072536 A | 6/1967 |
| GB | 1244895 A | 9/1971 |
| GB | 1531167 A | 11/1978 |
| GB | 2262522 A | 6/1993 |
| JP | 52129714 A | 10/1977 |
| JP | 56-69270 A | 6/1981 |
| JP | 56-92177 A | 7/1981 |
| JP | S59-146976 A | 8/1984 |
| JP | 60055459 B | 12/1985 |
| JP | S62-65988 A | 3/1987 |
| JP | 02-069363 A | 3/1990 |
| JP | 02-092871 A | 4/1990 |
| JP | 2225369 A | 9/1990 |

(56) References Cited

FOREIGN PATENT DOCUMENTS

| | | |
|---|---|---|
| JP | H03-83849 A | 4/1991 |
| JP | H04-310570 A | 11/1992 |
| JP | 5301762 A | 11/1993 |
| JP | 06-144922 | 5/1994 |
| JP | H08-48561 A | 2/1996 |
| JP | H08-175878 | 7/1996 |
| JP | 9030859 A | 2/1997 |
| JP | 9328357 A | 12/1997 |
| JP | 10218676 | 8/1998 |
| JP | 11-171639 A | 6/1999 |
| JP | 2942061 B2 | 8/1999 |
| JP | 11-343174 A | 12/1999 |
| JP | 2000-111024 A | 4/2000 |
| JP | 2002128563 A | 5/2002 |
| JP | 2003-081653 A | 3/2003 |
| JP | 2003-137671 A | 5/2003 |
| JP | 2004-026561 | 1/2004 |
| JP | 3489588 B2 | 1/2004 |
| JP | 2004-203691 A | 7/2004 |
| JP | 2004203702 A | 7/2004 |
| JP | 2004352600 A | 12/2004 |
| JP | 2005512926 A | 5/2005 |
| JP | 2006523599 A | 10/2006 |
| JP | 2007-504088 A | 3/2007 |
| JP | 2007-197303 A | 8/2007 |
| JP | 2008-501609 A | 1/2008 |
| JP | 2009-013036 A | 1/2009 |
| JP | 2009-158576 A | 7/2009 |
| JP | 2011-088759 A | 5/2011 |
| JP | 2011-093740 A | 5/2011 |
| JP | 2012-020925 A | 2/2012 |
| JP | 53090308 B2 | 1/2014 |
| RU | 1796601 A1 | 2/1993 |
| RU | 2030369 * | 3/1995 |
| RU | 2039025 C1 | 7/1995 |
| RU | 2140964 C1 | 11/1999 |
| SU | 391103 A1 | 7/1973 |
| SU | 945144 A1 | 7/1982 |
| SU | 1054331 A1 | 11/1983 |
| SU | 1470731 | 4/1989 |
| SU | 1675279 A1 | 9/1991 |
| TW | 200946467 A | 11/2009 |
| TW | I332487 B | 11/2010 |
| WO | 99/08804 A1 | 2/1999 |
| WO | 01-92183 A1 | 12/2001 |
| WO | 2005/023726 A1 | 3/2005 |
| WO | 2006/057669 A2 | 6/2006 |
| WO | 2009/007933 A1 | 1/2009 |
| WO | 2009/020011 A1 | 2/2009 |
| WO | 2009/096550 A | 8/2009 |
| WO | 2010/071892 A2 | 6/2010 |
| WO | 2010/073195 A1 | 7/2010 |
| WO | 2011/022639 A2 | 2/2011 |
| WO | 2011/055642 A | 5/2011 |
| WO | 2012/125507 A3 | 9/2012 |

OTHER PUBLICATIONS

Trushkova, et al., "Glass for ION-Exchange Strengthening", Plenum Publishing Company (1982), UDC 666.1.053.65, translated from Steklo I Keramika, No. 2, p. 13, dated Feb. 1982, 1 page.

"Standard Test Methods for Apparent Porosity, Water Absorption, Apparent Specific Gravity, and Bulk Density of Burned Refractory Brick and Shapes by Boiling Water", ASTM International, Designation: C20-00, Reapproved 2005, Copyright ASTM International, 3 pages.

International Search Report from PCT/US2012/031689 dated Oct. 25, 2012, 1 page.

International Search Report from PCT/US2012/028633 dated Oct. 18, 2012, 1 page.

International Search Report from PCT/US2013/021086 dated Jun. 17, 2013, 1 page.

Felsche, J., "The Alkali Problem in the Crystal Structure of Beta Alumina", Massachusetts Institute of Technology, Cambridge, Massachusetts, Received Jan. 22, 1968, 7 pages.

NIST Property Data Summaries, "Beta Alumina ($Al_2O_3$)", Date Created: Feb. 8, 2001; Last Updated: Feb. 8, 2001; 2 pages.

Search Results, 7 pages.

"The Saint=Gobain SEFPRO Unshaped Product Range 1991-2009", Jan. 1, 2009, pp. 1-7, XP002731397.

Yujuan, Zhang, "The Effects of $Ta_2O_5$ and MgO Additives on Microstructure and Mechanical Properties of Ultra-pure Alumina Ceramics," Journal of Wuhan Institute of Building Materials, Dec. 31, 1983, Issue 1, pp. 27-42.

Davis Jr., et al., "What You Should Know About Fusion-Cast Refractories", Glass Industry, Jan. 1, 1989, vol. 70, No. 9, pp. 14-16.

Wolfgang Schulle, "Feuerfeste Werkstoffe", Deutscher Verlag fur Grundstoffindustrie, Liebzig, Jan. 1, 1990, 2 pages (XP-002730933).

G. Routschka, et al., "Praxisbuch Feuerfeste Werkstoffe, 5., Auflage," Vulkan Verlag, Esse, DE, Jan. 1, 2011, 24 pages (XP-002730934).

A.A. Litvakovsky, "Fused Cast Refractories", Moscow, Gosstroyizdat, 1959, (I), p. 30-31, Monofrax MH and Monfrax H.

"1.Bauxitg" In: Akira Nishikawa; President Plibrico Japan Co., Ltd.: "Technology of Monolithic Refractories", Jan. 1, 1984 (Jan. 1, 1984), Japan,xP002744549, Preface; pp. 60-63.

\* cited by examiner

REFRACTORY OBJECT, GLASS OVERFLOW FORMING BLOCK, AND PROCESS OF FORMING AND USING THE REFRACTORY OBJECT

PRIORITY CLAIM AND CROSS-REFERENCE TO RELATED APPLICATION

The present application is a continuation of and claims priority from U.S. patent application Ser. No. 13/436,575 filed Mar. 30, 2012, entitled "Refractory Object, Glass Overflow Forming Block, and Process of Forming and Using the Refractory Object," and naming Olivier Citti et al. as inventors, which is incorporated by reference herein in its entirety. In addition, U.S. patent application Ser. No. 13/436,575 claims priority from U.S. Provisional Patent Application No. 61/469,502 filed on Mar. 30, 2011, and entitled "Refractory Object, Glass Overflow Forming Block, and Process of Forming and Using the Refractory Object," and naming Olivier Citti et al. as inventors, which is incorporated by reference herein in its entirety.

FIELD OF THE DISCLOSURE

This disclosure, in general, relates to a refractory object including a glass overflow trough and a glass overflow forming block.

BACKGROUND

Alkali alumino-silicate glasses that contain magnesium oxide are being used in applications where mechanical performance is more important. These glasses can be formed using a fusion draw process, where liquid glass flows over the lips of a glass overflow forming block made of zircon material and fuses at the bottom of the glass overflow forming block to form a sheet. In contact with alkali alumino-silicate glasses, zircon ($ZrSiO_4$) dissociates into $ZrO_2$ and $SiO_2$ at temperatures close to the glass forming temperature. The higher $SiO_2$ content may lead to formation of gas bubbles as it dissolves into the glass. $ZrO_2$ can create $ZrO_2$ solid nodules at the interface that can then be released into the glass forming defects. Accordingly, the glass overflow forming block has a reduced lifetime as zircon material erodes from the body of the glass overflow forming block while the glass that is manufactured is contaminated with an undesired element that disadvantageously affects its properties.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
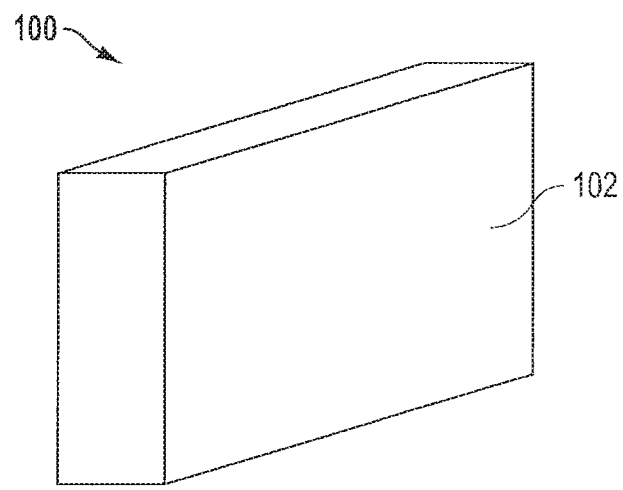
FIG. 1 is a diagram illustrating a particular embodiment of a refractory object.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

The term "averaged," when referring to a value, is intended to mean an average, a geometric mean, or a median value.

Group numbers corresponding to columns within the Periodic Table of the elements use the "New Notation" convention as seen in the *CRC Handbook of Chemistry and Physics,* $81^{st}$ Edition (2000-2001).

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the ceramic materials used as refractories.

In accordance with embodiments described herein, an alumina-based refractory object can be formed and have one or more properties that are better tailored to forming glass that includes aluminum, silicon, and magnesium ("Al—Si—Mg glass"). Further, the refractory object may have less corrosion. The lower corrosion may allow the refractory object to be used longer. For example, the lower corrosion may make the formation of valleys less likely and, accordingly, less likely to result in differences in glass layer thickness which may be incompatible with the glass making process. Further, the lower corrosion can also help to maintain the mechanical integrity of the refractory object. Further, when the refractory object includes a glass overflow forming block, the lower corrosion may reduce the amount of the material from the glass overflow forming block migrating into the glass formed using the glass overflow forming block and allow better control over the composition of the glass sheets formed using the glass overflow forming block and substantially prevent the formation of defects such as cords or knots. After reading this specification, skilled artisans will appreciate that not all of the properties are required in all embodiments, and therefore, the description of properties is meant to illustrate, and not limit, concepts as described herein.

The refractory object can be a sintered ceramic material containing at least 10% by weight (hereinafter "wt %") of $Al_2O_3$. The sintered ceramic material can have at least approximately 50 wt %, approximately 60 wt %, approximately 70 wt %, approximately 80 wt %, approximately 85 wt %, approximately 90 wt %, approximately 93 wt %, approximately 95 wt %, approximately 97 wt %, approximately 98 wt %, approximately 99 wt %, or even approximately 99.5 wt % of $Al_2O_3$.

The refractory object can further include a particular dopant, wherein the dopant includes an oxide of titanium (Ti), magnesium (Mg), tantalum (Ta), niobium (Nb), or any combination thereof. For example, the particular dopant can be $TiO_2$, $MgO$, $Ta_2O_5$, $Nb_2O_3$, or any combination thereof. Alternatively, any of the foregoing elements may be added as a boride, carbide, carbonate, nitrate, halide, phosphate, sulfate, or the like, as opposed to a metal oxide. In addition, one or more dopants can be added as an oxide in combination with a boride, carbide, carbonate, nitrate, halide, phosphate, sulfate, or the like.

The refractory object can include another dopant, such as a sintering agent. In a particular example, the sintering agent can help to reduce porosity, which can help to improve resistance to corrosion if the refractory object is later exposed to a corrosive environment. An exemplary sintering agent can include $Ta_2O_5$, $Nb_2O_3$, $Nb_2O_5$, $TiO_2$, $Fe_2O_3$, $MnO$, $CuO$, another suitable sintering agent, or any combination thereof. In a particular embodiment, a separate sintering agent is not used when the particular dopant as previously described can also act as a sintering agent, such as $MgO$ $Ta_2O_5$, $Nb_2O_3$, or $Nb_2O_5$.

In an embodiment, the refractory object can have less than approximately 6 wt % $SiO_2$. As will be discussed in more detail later in this specification, corrosion increases with increasing $SiO_2$ content in the refractory object. In another embodiment, the $SiO_2$ content may be less than approximately 4 wt %, less than approximately 3 wt %, less than approximately 0.9 wt % of $SiO_2$, less than approximately 0.5 wt %. In another embodiment, the content may be less than approximately 0.09 wt %, less than approximately 0.05 wt %, or less than approximately 0.009 wt %. Silicon or iron can be present as an undesired impurity in a starting material, such as $Al_2O_3$; however, $SiO_2$ may not be added as a separate component when combining powders before forming the corresponding green body for the refractory object.

In an embodiment, the amount of any dopant, including the particular dopant, can be at least approximately 0.02 wt %, at least approximately 0.11 wt %, at least approximately 0.2 wt %, or at least approximately 0.5 wt %. In another embodiment, the amount may be no greater than approximately 5 wt %, no greater than approximately 4 wt %, no greater than approximately 3 wt %, no greater than approximately 2 wt %, or no greater than approximately 1.5 wt %.

In a further embodiment, with respect to a particular dopant Ti, Mg, Ta, Nb, or any combination thereof, the amount of such particular dopant can be selected to be sufficient to keep the corrosion rates of the refractory object acceptably low.

The refractory object can be formed using metal oxides as previously described. In an embodiment, starting materials can include powders of the metal oxides. The $Al_2O_3$ powder can be in the form of particles having an averaged particle size no greater than approximately 100 µm. In an embodiment, the averaged particle size is no greater than approximately 30 in another embodiment, the averaged particle size is no greater than approximately 20 and in a further embodiment, the averaged particle size is no greater than approximately 15 µm. In an embodiment, the averaged particle size is at least approximately 0.5 in another embodiment, the averaged particle size is at least approximately 1.0 and in a further embodiment, the averaged particle size is at least approximately 5.0 µm.

In a particular embodiment, a combination of $Al_2O_3$ powders having different particle sizes can be used. The number of different particle sized $Al_2O_3$ powders can be two, three, four, or more. In a more particular embodiment, $Al_2O_3$ powders having two different particle sizes are used. In a particular embodiment, one of the $Al_2O_3$ powders can have an averaged particle size that is less than approximately 50%, less than approximately 40%, or less than approximately 30% of the averaged particle size of the other $Al_2O_3$ powder. For example, one of the $Al_2O_3$ powders can have a nominal particle size of 2 and the other $Al_2O_3$ powder can have a nominal particle size of 10 µm. The $Al_2O_3$ powders of different particle sizes can be mixed in any ratio. For example, $Al_2O_3$ powders having two different particle sizes can be mixed in a ratio of approximately 1:99, approximately 2:98, approximately 3:97, approximately 10:90, approximately 20:80, approximately 50:50, approximately 80:20, approximately 90:10, approximately 97:3, approximately 98:2, or approximately 99:1. Likewise, mixture of $Al_2O_3$ powders having three or more different sizes can be prepared in a ratio to meet the needs or desires for a particular application.

Reactive $Al_2O_3$ can help to increase the density and reduce the porosity of the refractory object. As used herein, "reactive $Al_2O_3$" is intended to mean that the particular $Al_2O_3$ powder has a surface area of at least two square meters per gram ($\geq 2$ m$^2$/g), and, "non-reactive $Al_2O_3$" is intended to mean that the particular $Al_2O_3$ powder has a surface area less than two square meters per gram (<2 m$^2$/g). In an embodiment, the amount of reactive $Al_2O_3$, as a fraction of total $Al_2O_3$ powder used to form the refractory object may include at least approximately 1% and may be up to 100% of the total $Al_2O_3$ powder used. A combination of reactive $Al_2O_3$ and non-reactive $Al_2O_3$ powders can be used. In a particular embodiment, at least approximately 2%, at least approximately 5%, at least approximately 11%, or at least approximately 20% of the $Al_2O_3$ used in forming the refractory object can be provided as reactive $Al_2O_3$. In another embodiment, no greater than approximately 99%, no greater than approximately 90%, no greater than approximately 80%, no greater than approximately 70%, no greater than approximately 60%, or no greater than approximately 50% of the $Al_2O_3$ used in forming the refractory object is provided as reactive $Al_2O_3$.

Another starting material can include a powder including a molecular compound including Ti, Mg, Ta, Nb, or any combination thereof, as such oxides are described with respect to the refractory object. The dopant starting materials may have any oxidation state oxide, e.g., $M^{2+}$, $M^{3+}$, $M^{4+}$, $M^{5+}$, or any combination thereof, wherein M is a Ti, Mg, Ta, or Nb. The dopant can be added as an oxide, a boride, a carbide, a carbonate, a nitrate, a sulfate, a halide, a phosphate, or any combination thereof. In an embodiment, the powder can be in the form of particles having an averaged particle size no greater than approximately 30 µm, in another embodiment, the averaged particle size is no greater than approximately 20 µm, and in a further embodiment, the averaged particle size is no greater than approximately 15 µm. In an embodiment, the averaged particle size is at least approximately 0.1 µm, in another embodiment, the averaged particle size is at least approximately 0.5 µm, and in a further embodiment, the averaged particle size is at least approximately 1 µm.

Additional material that can be used can include a binder, a solvent, a dispersant, a thickener, a deflocculant, another suitable ingredient, or any combination thereof. In an embodiment, the additional material may include non-metallic compounds. In another embodiment, the additional material can include an organic compound, water, or the like.

The powders and additional material are combined and shaped to form a green body into a desired shape. Shaping can be performed using a technique, such as slip casting, uniaxial pressing, isostatic pressing, casting of a gel, vibrocasting, or any combination thereof. The shape can be rectilinear, cylindrical, spherical, ellipsoidal or nearly any other shape. In a particular embodiment, the body can be in the shape of a rectilinear block referred to as a blank that can subsequently be machined to form a glass overflow forming block. In another embodiment, the green body can be structured in such fashion to more closely match the final refractory object to reduce the extent of any further machine processing. For example, when the refractory object includes a glass overflow forming block, the shape of the green body may more closely resemble the glass overflow forming block to reduce the amount of subsequent machining and ceramic material that would be discarded. More particularly, the green body may have a rectilinear portion adjacent to a tapered portion. The rectilinear portion has a region corresponding to where a glass overflow trough will be formed. In another embodiment, the green body may be shaped to have the glass overflow trough adjacent to the tapered portion After the green body is formed, the green body is heated in an oven, heater, furnace, or the like to form the refractory object that includes a sintered ceramic material. The heating process can include an initial heating where moisture, a solvent, or another volatile component is evaporated, organic material is vaporized, or any combination thereof. The initial heating can be conducted at a temperature in a range of approximately 100° C. to approximately 300° C. for a time period in a range of approximately 10 hours to approximately 200 hours. Following the initial heating, the sintering can be performed at a temperature in a range of approximately 1400° C. to 1700° C. for a time period in a range of approximately 10 hours to approximately 100 hours to form the refractory object.

The shape of the refractory object generally corresponds to the shape of the green body. Thus, the refractory object may have any of the shapes as previously described with respect to the green body. During sintering, some shrinkage may occur, and the refractory object may be smaller than the green body. In an embodiment as illustrated in FIG. 1, a refractory object 100 can be a refractory block 102 having a rectilinear shape having a length (l), width (w), and height (h). In an embodiment, any of the dimensions 1, w, or h can be at least approximately 0.02 m, at least approximately 0.05 m, at least approximately 0.11 m, at least approximately 0.5 m, at least approximately 1.1 m, at least approximately 2.0 m, at least approximately 4.0 m, or more. In the embodiment as illustrated in FIG. 1, the refractory block 102 can be a blank from which a glass overflow forming block can be formed.

Figure 2:
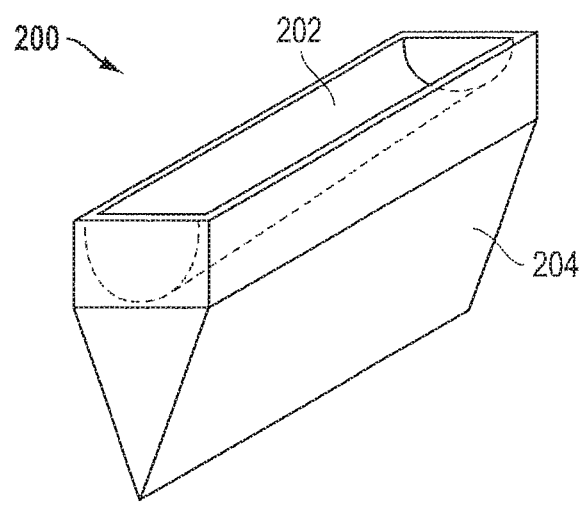
FIG. 2 is a diagram illustrating a particular embodiment of a glass overflow trough.
Figure 3:
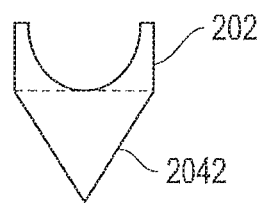
FIG. 3 is a diagram illustrating a particular set of various cross-sectional perspectives of glass overflow troughs.
Figure 3:
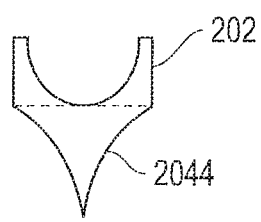
Figure 3:
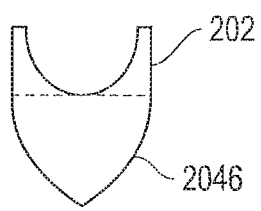

The refractory object can be machined to produce a different shape, a smoother surface, or both. The refractory block 102 can be machined to form a glass overflow forming block 200, as illustrated in FIG. 2. The glass overflow forming block 200, which is also a refractory object, has a body that includes a glass overflow trough portion 202 and a tapered portion 204. The glass overflow trough portion 202 includes a trough that has a depth that decreases along a length of the glass overflow forming block 200. FIG. 3 includes a cross-sectional view of exemplary shapes of the tapered portion 204. More particularly, the tapered portion can include a wedge shape 2042, a concave shape 2044, or a convex shape 2046. Other shapes may be used to meet the needs or desires for a particular application.

The refractory object may have one or more properties that are particularly noteworthy. Such properties can include density, porosity, and corrosion rate.

Density and porosity of the refractory object can be determined using ASTM C20-00 Standard Test Method (reapproved 2005). In an embodiment, the density can be at least approximately 3.55 g/cc, at least approximately 3.60 g/cc, or at least approximately 3.65 g/cc. In another embodiment, the density may be no greater than approximately 3.90 g/cc, no greater than approximately 3.85 g/cc, no greater than approximately 3.80 g/cc, no greater than 3.75 g/cc, or no greater than approximately 3.70 g/cc. Porosity is expressed as a volume percent ("vol %"). In an embodiment, the porosity of the refractory object is at least approximately 0.05 vol %, at least 0.2 vol %, at least 0.4 vol. %, at least approximately 0.8 vol %, at least approximately 1.1 vol %, at least approximately 1.5 vol %, at least approximately 2.0 vol %, at least approximately 3.0 vol %, or at least approximately 4 vol %.

Corrosion is a measurement of how much of the refractory object is eroded when exposed to a particular corrosive environment at a predetermined temperature for a predetermined time period. Below is a formula for determining the volume corroded.

$$V_{corroded} = V_{init} - V_{final}$$

where $V_{corroded}$ is the volume of the refractory object that is removed during the corrosion test;

$V_{init}$ is the volume of the refractory object before the corrosion test (using a Hg pycnometer); and $V_{final}$ is the volume of the refractory object after the corrosion test (using a Hg pycnometer).

In a particular embodiment, a portion of the refractory object is submerged in an alkali Al—Mg—Si glass at 1400° C. for 90 hours while rotating the refractory object such that the outer surface of the refractory object is moving at 27 cm/min. More specifically, the glass includes 61.9 wt % $SiO_2$, 17.5 wt % $Al_2O_3$, 12.6 wt % $Na_2O$, and 3.5 wt % $K_2O$, and 3.5 wt % MgO.

The corrosion rate is a measure of how much of the refractory object wears away during use. If the refractory object is used in forming glass sheets, as the refractory object corrodes, the changed shape of the refractory object can affect the quality of the glass sheets produced by it. The corrosion rate is expressed in a linear measurement per time, and in this application, is expressed in mm/year. The corrosion rate can be determined by the following equations.

$$Cut = V_{corroded}/SA_{init}$$

where $V_{corroded}$ is the volume corroded as calculated using the formula previously given;

Cut is the thickness reduction of the refractory object during the corrosion test; and $SA_{init}$ is the initial surface area of the refractory object before the corrosion test.

Cut rate=(Cut/$T_{test}$)×8760 hours/year where $T_{test}$ is the time duration of the corrosion test in hours.

The corrosion rate is typically expressed at or near the normal operating temperature of the refractory block, which is 1150° C. in a particular embodiment. As previously described, the corrosion test can be performed at a temperature of 1400° C. and above. However, dynamic corrosion tests are not run at the operating temperature of 1150° C. due to the very high viscosity of the glass (35000 poise). In addition, at this low temperature the corrosion rate is very low, and corrosion volumes are very low which alter the accuracy of the test and, therefore, its representativeness. Therefore, a higher temperature, which corresponds more closely to a viscosity of 3000 poise for the molten glass, is chosen.

Note that the amount of corrosion is an exponential function of temperature and is a power function of the velocity of the refractory object with respect to the molten glass, so it is possible to extrapolate the corrosion rate at 1150° C. based on corrosion data at a different temperature and velocity of molten glass. The corrosion at 1400° C. is significantly higher than the corrosion at 1150° C., and similarly, the corrosion at 160 cm/min. is significantly higher than the corrosion at 27 cm/min. Thus, the cut rates can be estimated for different temperatures and velocities. Accordingly, corrosion rate is obtained by adjusting the corrosion data to 27 cm/min. and 1150° C. to obtain an adjusted cut rate, referred to herein as a "corrosion rate," and then changing the corrosion rate to a thickness per year. In an embodiment, the corrosion rate into the refractory object is no greater than approximately 2.7 mm/year, no greater than approximately 2.4 mm/year, no greater than approximately 1.9 mm/year, or no greater than approximately 1.6 mm/year. The corrosion rate is typically greater than 0.00 mm/year.

Figure 4:
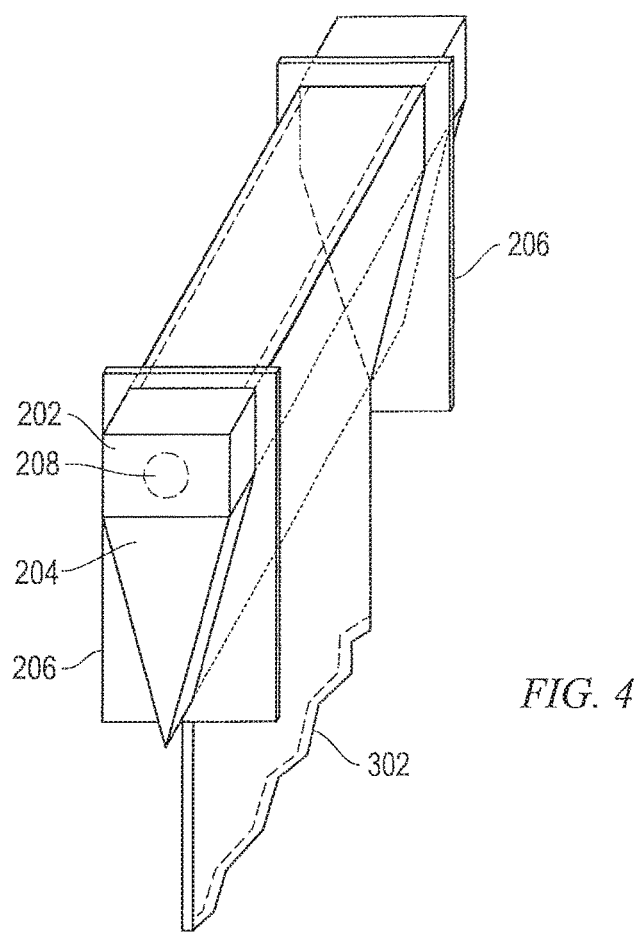
FIG. 4 is a diagram illustrating the formation of a particular glass sheet from the glass overflow trough.
Figure 5:
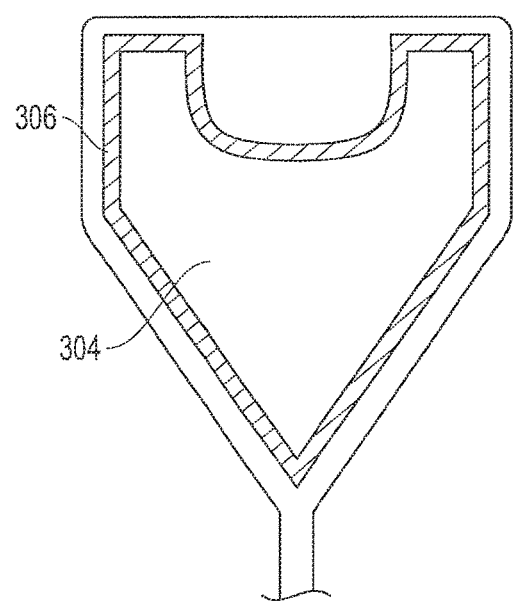
FIG. 5 is a diagram illustrating the cross-sectional setup of a glass overflow trough during glass production.

The refractory object, when in the form of a glass overflow forming block, can be useful in forming a glass sheet by a fusion process. FIGS. 4 and 5 include a perspective view and a cross-sectional view, respectively, of the glass overflow forming block during the formation of a glass sheet 302. The glass overflow forming block is heated to a temperature in a range of approximately 1050° C. to approximately 1300° C. The glass overflow forming block includes the glass overflow trough portion 202 and the tapered portion 204, as previously described. In the embodiment as illustrated, the glass overflow forming block also includes end guards 206 that generally define the width of the glass sheet 302 to be formed. The glass overflow forming block further includes an inlet port 208 that receives a molten glass composition. A trough within the glass overflow trough portion 202 receives the molten glass composition until the trough fills up. Thereafter, the molten glass composition flows over opposing lips of the glass overflow trough portion 202. The molten glass composition then flows along opposite outer surfaces of the glass overflow trough portion 202 and the tapered portion 204. At the end of the tapered portion 204 that is opposite the glass overflow trough portion 202, the molten glass composition along the opposite outer surfaces fuse together to form the glass sheet 302. In another embodiment, another type of glass object may be formed.

In an embodiment, the glass sheet 302 can have a thickness of at least approximately 20 µm, at least approximately 30 µm, or at least approximately 50 µm. In another embodiment, the glass sheet 302 may have a thickness no greater than approximately 5 mm, no greater than approximately 3 mm, or no greater than approximately 1.1 mm. With respect to the width, the process allows the end guards 206 to be set to permit any desired width of the glass sheet 302. For example, the glass sheet 302 can have a width of at least approximately 0.5 m, at least approximately 1.1 m, at least approximately 2.0 m, at least approximately 4.0 m, or larger.

In a particular embodiment, the molten glass composition includes an Al—Mg—Si glass. In a more particular embodiment, the molten glass composition is substantially the same as described. Referring to FIG. 5, during the glass formation process, Mg from the molten glass composition can form a layer 306 along surfaces of the body 304 of the glass overflow forming block. The layer can include a Mg—Al oxide. In a more particular embodiment, the layer can include $Mg_xAl_yO_z$, wherein z=x+1.5 y. In another more particular embodiment, the layer 306 includes a Mg—Al spinel.

Many different aspects and embodiments are possible. Some of those aspects and embodiments are described herein. After reading this specification, skilled artisans will appreciate that those aspects and embodiments are only illustrative and do not limit the scope of the present invention.

In a first aspect, a refractory object used in forming a glass object, wherein the refractory object can include at least 10 wt % $Al_2O_3$. The refractory object can have less than approximately 6 wt % of $SiO_2$, a first dopant including an oxide of Ti, Mg, Ta, Nb, or any combination thereof, or any combination of the foregoing.

In a second aspect, a refractory object can be used in forming a glass object, wherein the refractory object can include at least 10 wt % $Al_2O_3$. The refractory object can have a density of at least approximately 3.55 g/cc, a corrosion rate no greater than 2.69 mm/year, or any combination of the foregoing.

In a third aspect, a process of forming a glass object can include providing a refractory object including a glass overflow trough that includes at least 10 wt % $Al_2O_3$; and at least one of less than approximately 6 wt % of $SiO_2$, or a first dopant including an oxide of Ti, Mg, Ta, Nb, or any combination thereof. The process can also include flowing a glass material including Al—Si—Mg oxide into the glass overflow trough and over a lip of the glass overflow trough to define a glass contacting area. The process can further include cooling the glass material to form the glass object.

In an embodiment of the third aspect, the glass object is in a form of a glass sheet. In a particular embodiment, the glass sheet has a thickness of at least approximately 20 at least approximately 30 or at least approximately 50 In another particular embodiment, the glass sheet has a thickness no greater than approximately 5 mm, no greater than approximately 3 mm, or no greater than approximately 1.1 mm. In still another particular embodiment, the glass sheet has a width of at least approximately 0.2 m, at least approximately 0.5 m, at least approximately 0.7 m, at least approximately 1.1 m, at least approximately 2.0 m, at least approximately 2.4 m, or at least approximately 2.8 m. In a further embodiment, the glass object includes an alkali glass.

In a fourth aspect, a process of forming a refractory object can include preparing a body including at least 10 wt % $Al_2O_3$, wherein the body has less than approximately 6 wt % of $SiO_2$, or a first dopant including a compound of Ti, Mg, Ta, Nb, or any combination thereof. The process can also include sintering the body to form the refractory object.

In an embodiment of the fourth aspect, the process further includes shaping the refractory object into a glass overflow forming block. In another embodiment, the body includes a shape of a glass overflow forming block.

In a particular embodiment of any of the embodiments or aspects described herein, the refractory object has a density of at least approximately 3.55 g/cc, a corrosion rate no greater than 2.69 mm/year, or any combination of the foregoing. In another particular embodiment, the first dopant is $TiO_2$, MgO, $Ta_2O_5$, $Nb_2O_5$, or any combination thereof. In still another particular embodiment, a content of the first dopant is no greater than approximately 5 wt %, no greater than approximately 4 wt %, no greater than approximately 3 wt %, no greater than approximately 2 wt %, or no greater than approximately 1.5 wt %. In yet another particular embodiment, a content of the first dopant is at least approximately 0.02 wt %, at least approximately 0.11 wt %, at least approximately 0.2 wt %, or at least approximately 0.5 wt %. In a further particular embodiment, the $Al_2O_3$ is present in an amount by weight of at least approximately 80%, approximately 90%, or approximately 95%. In still a further particular embodiment, at least approximately 1%, at least approximately 2%, at least approximately 5%, at least approximately 11%, or at least approximately 20% of the $Al_2O_3$ in the refractory object is provided as reactive $Al_2O_3$. In yet a further particular embodiment, no greater than approximately 99%, no greater than approximately 90%, no greater than approximately 80%, no greater than approximately 70%, no greater than approximately 60%, or no greater than approximately 50% of the $Al_2O_3$ in the refractory object is provided as reactive $Al_2O_3$. In another particular embodiment, the refractory object has less than approximately 6 wt % of $SiO_2$, less than approximately 4 wt % of $SiO_2$, less than approximately 3 wt % of $SiO_2$, less than approximately 0.9 wt % of $SiO_2$, less than approximately 0.5 wt % of $SiO_2$, less than approximately 0.09 wt % of $SiO_2$, less than approximately 0.05 wt % of $SiO_2$, or less than approximately 0.009 wt % of $SiO_2$.

In a particular embodiment of any of the embodiments or aspects described herein, the corrosion rate is no greater than approximately 2.69 mm/year, no greater than approximately 2.4 mm/year, no greater than approximately 1.9 mm/year, or no greater than approximately 1.6 mm/year. In another particular embodiment, the refractory object further includes a second dopant that includes a sintering agent. In still another particular embodiment, the refractory object further includes a second dopant that is a sintering agent and is different from the first dopant.

In a particular embodiment of any of the embodiments or aspects described herein, the density is at least approximately 3.55 g/cc, at least approximately 3.60 g/cc, or at least approximately 3.65 g/cc. In another particular embodiment, the density is no greater than approximately 3.90 g/cc, no greater than approximately 3.85 g/cc, no greater than approximately 3.80 g/cc, no greater than 3.75 g/cc, or no greater than approximately 3.70 g/cc. In still another particular embodiment, the porosity is at least approximately 0.05 vol %, at least approximately 0.1 vol %, at least approximately 0.2 vol %, at least 0.4 vol %, at least approximately 0.8 vol %, at least approximately 1.1 vol %, at least approximately 1.5 vol %, at least approximately 2.0 vol %, at least approximately 3.0 vol %, or at least approximately 4 vol %. In yet another particular embodiment, the refractory object has a porosity no greater than approximately 9.0 vol %, no greater than approximately 7.0 vol %, or no greater than approximately 5.0 vol %.

In a particular embodiment of any of the embodiments or aspects described herein, the refractory object has at least approximately 95% by weight $Al_2O_3$, of which at least approximately 75% of the $Al_2O_3$ is reactive $Al_2O_3$, less than approximately 4 wt % of $SiO_2$, a first dopant including an oxide of Ti, Mg, Ta, Nb, or any combination thereof, and a density of at least approximately 3.60 g/cc. In a more particular embodiment, the first dopant including an oxide of Ti, Mg, Ta, Nb, or any combination thereof. In another more particular embodiment, the first dopant is in a range of approximately 0.11 wt % to 2.0 wt %.

In another particular embodiment of any of the embodiments or aspects described herein, the refractory object includes a glass overflow trough portion. In still another particular embodiment, the refractory object includes a glass overflow forming block. In a more particular embodiment, the glass overflow forming block has a cross section in a shape that is tapered from the bottom of the glass overflow forming block. In another more particular embodiment, the glass overflow forming block has a cross section in a shape of a wedge.

In a further particular embodiment of any of the embodiments or aspects described herein, the refractory object has a length of at least approximately 0.5 m, approximately 1.1 m, at least approximately 2.0 m, or at least approximately 4.0 m.

EXAMPLES

The concepts described herein will be further described in the following examples, which do not limit the scope of the invention described in the claims. Numerical values in this Examples section may be approximated or rounded off for convenience.

Refractory objects including a variety of different sintered ceramic materials are prepared using the following process and following raw materials. Table 1 includes the compositions of the samples, all of which are principally alumina containing. Trace levels of impurities may be present but are not reported, as such impurities typically do not significantly affect the performance of such samples.

During a first step the alumina powders and dopants are mixed with deflocculants and water so as to form a slurry of powders. The mixture of the raw materials is then spray dried so as to form a batch that is then formed into a green body (100×100×150 mm) by isostatic pressing. The slurry could also be used as is to form the green body using slip-casting, vibrocasting or other casting techniques. The raw materials could also be dry-mixed and then formed into a block using another forming technique, such as unidirectional pressing, ramming or other dry forming techniques. In a last step the green body is fired at a temperature of at least 1400° C. and up to 1700° C. so as to produce a dense refractory block.

TABLE 1

| Name | Composition |
|---|---|
| Sample 1 | 0.2 wt % $TiO_2$, remainder is $Al_2O_3$ that includes 25% reactive $Al_2O_3$ |
| Sample 2 | 1 wt % $Ta_2O_5$, remainder is $Al_2O_3$ that includes 25% reactive $Al_2O_3$ |

TABLE 1-continued

| Name | Composition |
|---|---|
| Sample 3 | 1 wt % $Nb_2O_5$, remainder is $Al_2O_3$ the includes 25% reactive $Al_2O_3$ |
| Sample 4 | 0.2 wt % $TiO_2$, remainder is $Al_2O_3$ that includes 50% reactive $Al_2O_3$ |
| Sample 5 | 1 wt % $TiO_2$, remainder is $Al_2O_3$ that includes 100% reactive $Al_2O_3$ |

The samples are tested to determined density, porosity, and corrosion. The density and porosity are determined using the methodologies as previously described.

Corrosion is determined by partially submerging the samples into a molten glass composition including 61.9 wt % $SiO_2$, 17.5 wt % $Al_2O_3$, 12.6 wt % $Na_2O$, and 3.5 wt % $K_2O$, and 3.5 wt % MgO. The temperature is kept at 1400° C. for 90 hours while the samples are rotated at 6 rpm or 160 cm/min. Table 2 below summarizes the results of the tests.

TABLE 2

| Name | Density (g/cc) | Porosity (%) | Corrosion (delta V/V, %) |
|---|---|---|---|
| Sample 1 | 3.65 | 5.4 | 5.9 |
| Sample 2 | 3.66 | 4.0 | 4.6 |
| Sample 3 | 3.57 | 8.1 | 3.8 |
| Sample 4 | 3.68 | 3.4 | 4.4 |
| Sample 5 | 3.75 | 1.2 | 5.0 |

Additional samples are made using the techniques previously described and have the compositions as listed in Table 3. Tests are repeated on some of the compositions of the prior samples, and therefore such compositions are not described in Table 3. Table 3 includes compositions not previously described.

TABLE 3

| Name | Composition |
|---|---|
| Sample 6 (#1 and #2) | 100% reactive $Al_2O_3$ |
| Sample 7 | 3 wt % fused aluminum silicate, remainder is $Al_2O_3$ that includes 100% reactive $Al_2O_3$ |
| Sample 8 | 5 wt % fused aluminum silicate, 0.9% TiO2, remainder is $Al_2O_3$ that includes 10% reactive $Al_2O_3$ |
| Sample 9 (#1 and #2)* | 5 wt % mullite, 0.9% TiO2, remainder is $Al_2O_3$ that includes 10% reactive $Al_2O_3$ |
| Sample 10 | 10 wt % mullite, remainder is $Al_2O_3$ that includes 80% reactive $Al_2O_3$ |

*Different samples having substantially the same composition were used in different tests and are noted as #1 and #2, although one description of the composition is provided.

The samples are tested to determine density, porosity, and corrosion, wherein some of the compositions and corrosion test conditions are changed. The density and porosity are determined using the methodologies as previously described. For the corrosion test, the temperature is kept at 1400° C. for 120 hours while the samples are rotated at 0.036 rpm or 1 cm/min. Table 4 below summarizes the results of the tests.

TABLE 4

| Name | Density (g/cc) | Porosity (%) | Corrosion (delta V/V, %) |
|---|---|---|---|
| Sample 6 (#1) | 3.79 | 1.3 | 8.2 |
| Sample 7 | 3.69 | 0.2 | 11.8 |
| Sample 8 | 3.54 | 0.2 | 13.4 |
| Sample 9 (#1) | 3.62 | 0.1 | 10.3 |
| Sample 10 | 3.60 | 3.2 | 11.5 |

Further samples are made using the techniques previously described. Tests are repeated on some of the compositions of the prior samples, and therefore such compositions are not described in Table 5. Table 5 includes compositions not previously described.

TABLE 5

| Name | Composition |
|---|---|
| Sample 11 | 5 wt % fused aluminum silicate, remainder is $Al_2O_3$ that includes 100% reactive $Al_2O_3$ (different particle size compared to Sample 7) |
| Sample 12 | 1 wt % MgO, remainder is $Al_2O_3$ that includes 100% reactive $Al_2O_3$ |
| Sample 13 | 100 wt % spinel ($Al_2O_3$—MgO) |
| Sample 14 | 1 wt % $Ta_2O_5$, 79 wt % $Al_2O_3$ that includes 20% reactive $Al_2O_3$, 20 wt % mullite. |

The samples are tested to determined density, porosity, and corrosion. For the corrosion test, the temperature is kept at 1400° C. for 120 hours while the samples are rotated at 1 rpm or 27 cm/min. Table 6 below summarizes the results of the tests.

TABLE 6

| Name | Density (g/cc) | Porosity (%) | Corrosion (delta V/V, %) |
|---|---|---|---|
| Sample 6 (#2) | 3.78 | 1.8 | 7.1 |
| Sample 11 | 3.63 | 0.2 | 7.7 |
| Sample 12 | 3.80 | 0.2 | 3.8 |
| Sample 9 (#2) | 3.63 | 0.2 | 8.4 |
| Sample 13 | 2.84 | 19.5 | 42.8 |
| Sample 14 | 3.57 | 0.2 | |

Table 7 summarizes information regarding the samples. The powders used to form the composition are provided as weight percents. Different $Al_2O_3$ powders are used, and therefore, the surface area of the $Al_2O_3$ powders are included. Total $TiO_2$ and $SiO_2$ are reported, as such materials may be present as impurities in starting materials that are not principally $TiO_2$ or $SiO_2$. Some of the weight percents do not add up to exactly 100 wt % due to rounding errors. In addition, the corrosion rate for Sample 14 is estimated based on its composition and the data of the other samples described herein.

TABLE 7

| | SAMPLES | | | | | | |
|---|---|---|---|---|---|---|---|
| | Zircon | 1 | 2 | 3 | 4 | 5 | 6 | 7 |
| $Al_2O_3$ - 0.9 m²/g | | 75 | 75 | 75 | 50 | | | |

TABLE 7-continued

|  | | | | | | | |
|---|---|---|---|---|---|---|---|
| Al₂O₃ - 4.7 m²/g | | 12.5 | 12.5 | 12.5 | 25 | | |
| Al₂O₃ - 4.9 m²/g | | | | | | 99 | 97 |
| Al₂O₃ - 0.6 m²/g | | | | | | | |
| Al₂O₃ - 11 m²/g | | | | | | | |
| Al₂O₃ - 2.7 m²/g | | 12.5 | 12.5 | 12.5 | 25 | | |
| Al₂O₃ - 8.4 m²/g | | | | | | 100 | |
| TiO₂ | | 0.2 | | | 0.2 | 1 | |
| MgO | | | | | | | |
| Spinel (Al₂O₃—MgO) | | | | | | | |
| Mullite | | | | | | | |
| SiO₂ | | | | | | | |
| Fused alumina silicate | | | | | | | 3 |
| Ta₂O₅ | | 1 | | | | | |
| Nb₂O₃ | | | 1 | | | | |
| Total | | 100.2 | 101 | 101 | 100.2 | 100 | 100 | 100 |
| Total TiO₂ | | 0.2 | 0 | 0 | 0.2 | 1 | 0 | 0.012 |
| Total SiO₂ | | 0 | 0 | 0 | 0 | 0 | 0 | 0.6 |
| Density | 4.1 | 3.65 | 3.67 | 3.57 | 3.68 | 3.75 | 3.79 | 3.69 |
| Porosity | 5 | 5.4 | 4.3 | 8.1 | 3.4 | 1.2 | 1.3 | 0.2 |
| Corrosion rate (mm/y) | 11.25 | 2.21 | 1.70 | 1.4 | 1.63 | 1.85 | 1.68 | 2.43 |

| | SAMPLES | | | | | | |
|---|---|---|---|---|---|---|---|
| | 8 | 9 | 10 | 11 | 12 | 13 | 14 |
| Al₂O₃ - 0.9 m²/g | 74.1 | 74.1 | 10 | | | | 59 |
| Al₂O₃ - 4.7 m²/g | | | 80 | | | | |
| Al₂O₃ - 4.9 m²/g | | | | | 99 | | 20 |
| Al₂O₃ - 0.6 m²/g | 10 | 10 | | | | | |
| Al₂O₃ - 11 m²/g | 10 | 10 | | | | | |
| Al₂O₃ - 2.7 m²/g | | | | 95 | | | |
| Al₂O₃ - 8.4 m²/g | | | | | | | |
| TiO₂ | 0.9 | 0.9 | | | | | |
| MgO | | | | | 1 | | |
| Spinel (Al₂O₃—MgO) | | | | | | 100 | |
| Mullite | | 5 | 10 | | | | 20 |
| SiO₂ | | | | | | | |
| Fused alumina silicate | 5 | | | 5 | | | |
| Ta₂O₅ | | | | | | | 1 |
| Nb₂O₃ | | | | | | | |
| Total | 100 | 100 | 100 | 100 | 100 | 100 | 100 |
| Total TiO₂ | 0.92 | 0.9 | 0 | 0.02 | 0 | 0 | 0.55 |
| Total SiO₂ | 1 | 1.4 | 2.8 | 1 | 0 | 0 | 5.69 |
| Density | 3.54 | 3.62 | 3.58 | 3.63 | 3.8 | 2.84 | 3.57 |
| Porosity | 0.2 | 0.1 | 3.8 | 0.2 | 0.2 | 19.2 | 0.2 |
| Corrosion rate (mm/y) | 2.76 | 2.11 | 2.37 | 1.62 | 0.79 | 9.00 | 2.30 |

The performance of the refractory object in normal use is a significant factor to consider when selecting a composition. A typical zircon composition has a corrosion rate of 11.3 mm/year. Spinel (Sample 13) has a corrosion rate of 9.0 mm/year. Thus, with respect to corrosion in the alkali Al—Mg—Si glass, the performance of spinel is similar to that of zircon. All of the alumina-based compositions including at least approximately 80 wt % alumina ("80+% alumina") perform substantially better than zircon and spinel. Therefore, the typical zircon composition and spinel are not well suited to be a glass overflow forming block for forming fused glass sheets having the particular alkali Al—Mg—Si glass composition used for the corrosion test.

As can be seen in Table 7, many of the 80+% alumina samples have corrosion rates lower than 2.7 mm/year. Sample 12 (1 wt % MgO, remainder reactive $Al_2O_3$) has a corrosion rate of 0.8 mm/year, which is the lowest of the samples tested. Sample 8 (5 wt % fused alumina silicate, remainder $Al_2O_3$, of which 10% is reactive $Al_2O_3$) has a corrosion rate of 2.8 mm/year. Thus, Sample 8 has the highest corrosion rate of the 80+% alumina samples.

A comparison of Samples 8 and 12 provide some interesting observations. Sample 12 includes approximately 1 wt % MgO, substantially no $TiO_2$ or $SiO_2$, and all $Al_2O_3$ is from a reactive $Al_2O_3$ powder. Sample 8 includes substantially no MgO, approximately 1 wt % $SiO_2$ (from the 5 wt % fused alumina silicate starting powder), 0.9 wt % $TiO_2$, and only 10% of the $Al_2O_3$ is from a reactive $Al_2O_3$ powder. Sample 12 has a density of 3.80 g/cc and a porosity of 0.2 vol %, and Sample 8 has a density of 3.54 g/cc and porosity of 0.2 vol %. With respect to density, Sample 12 has the highest density, and Sample 8 has the lowest density of the 80+% alumina samples.

Figure 6:
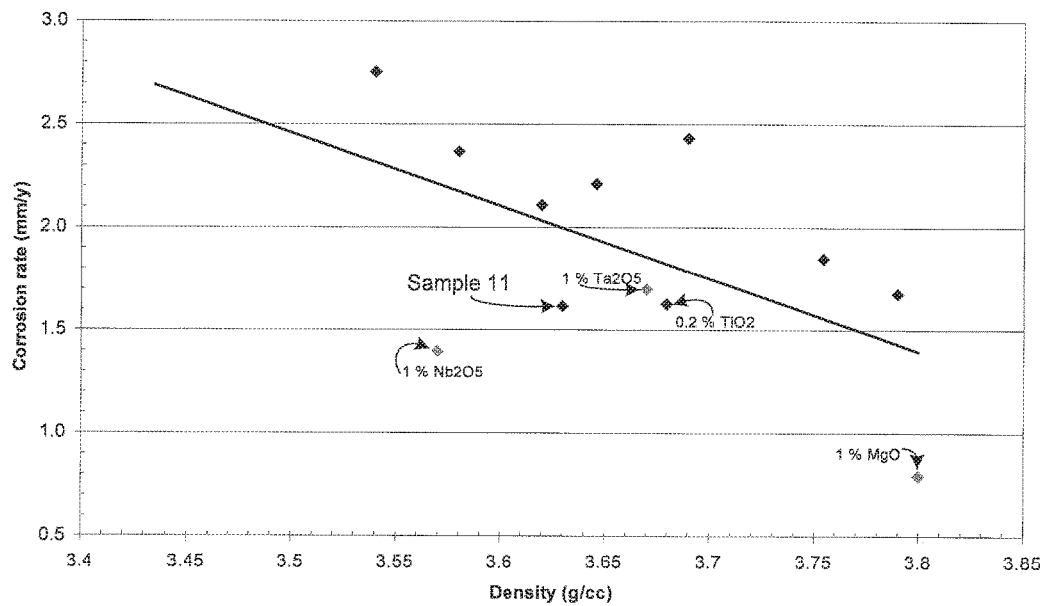
FIGS. 6 to 9 are plots of corrosion rate as a function of different variables.

In view of the differences between Samples 8 and 12, plots of corrosion rate versus different parameters are illustrated in FIGS. 6 to 9. FIG. 6 includes a plot of densities and corresponding corrosion rates for the 80+% alumina samples. Corrosion rate decreases as density increases, as represented by the line in FIG. 6. Some of the particular samples are labeled in FIG. 6. Sample 12 (1 wt % MgO) and Sample 3 (1 wt % $Nb_2O_5$) have substantially low corrosion rates for their particular densities. Samples 4 (1 wt % $Ta_2O_5$), 5 (0.2 wt % $TiO_2$), and 12 have corrosion rates that are lower than would have been expected for their densities.

Figure 7:
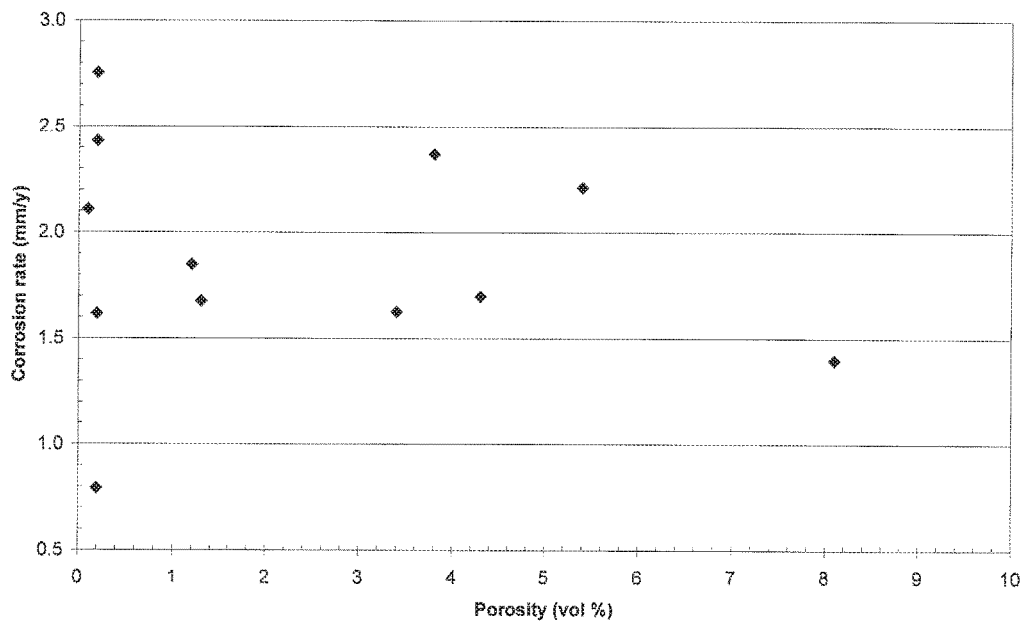

FIG. 7 includes a plot of porosities and corresponding corrosion rates for the 80+% alumina samples. The data suggest that there is no significant correlation between porosity and corrosion rate.

Figure 8:
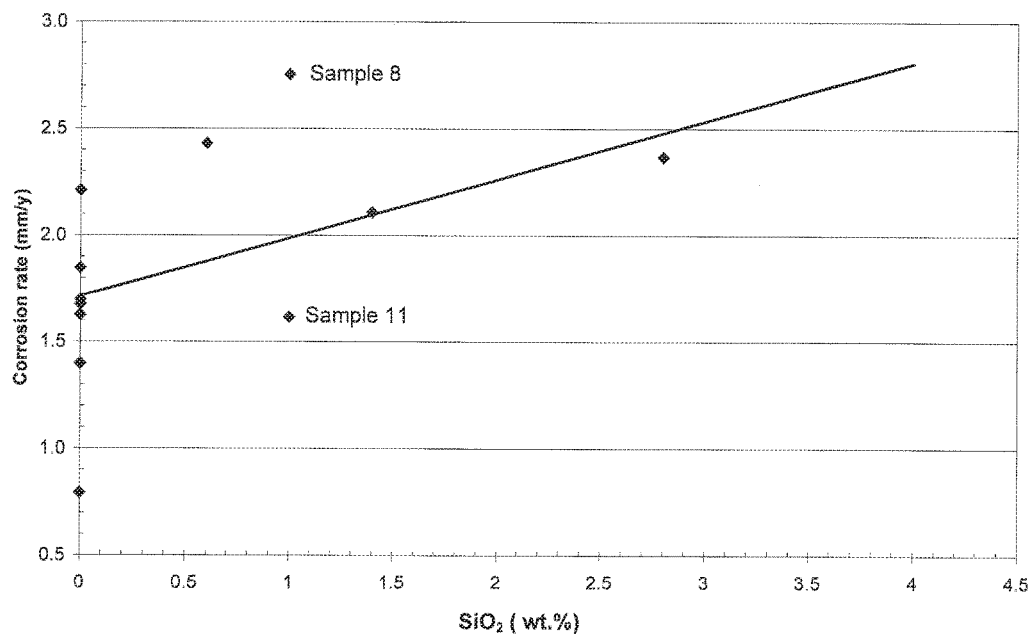

FIG. 8 includes a plot of $SiO_2$ content and corresponding corrosion rates for the 80+% alumina samples. Corrosion rate increases as $SiO_2$ content increases, as represented by the line in FIG. 8. Samples 8 and 11 have substantially the same $SiO_2$ content. Samples 8 and 11 differ in the amount of reactive $Al_2O_3$ and $TiO_2$ within the samples. The amount of reactive $Al_2O_3$ used to make Sample 8 is 10%, and the amount of reactive $Al_2O_3$ used to make Sample 11 is 100%. Thus, the amount of reactive $Al_2O_3$ used in the starting $Al_2O_3$ powder and the amount of $TiO_2$ can be significant.

Figure 9:
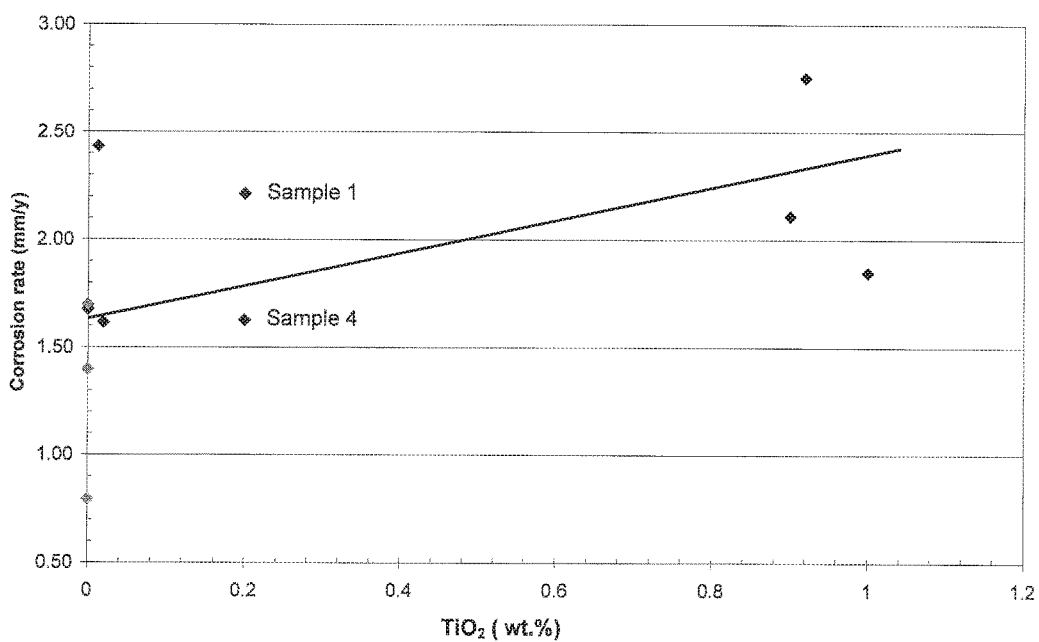

FIG. 9 includes a plot of $TiO_2$ content and corresponding corrosion rates for the 80+% alumina samples. Corrosion rate increases as $TiO_2$ content increases, as represented by the line in FIG. 9; however, the effect of $TiO_2$ may be complicated, and therefore, $TiO_2$ may need to be investigated in more detail to better understand the impact of $TiO_2$ with respect to the corrosion rate. Samples 1 and 4 have substantially the same $TiO_2$ content. Samples 1 and 4 differ in the amount of reactive $Al_2O_3$ within the samples. The amount of reactive $Al_2O_3$ used to make Sample 1 is 25%, and the amount of reactive $Al_2O_3$ used to make Sample 4 is 100% $Al_2O_3$. Just like Samples 8 and 11, the amount of reactive $Al_2O_3$ used in the starting $Al_2O_3$ powder appears to be significant.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A refractory object used in forming a glass object, the refractory object comprising:
    at least 95 wt % $Al_2O_3$;
    less than 0.009 wt % of $SiO_2$;
    less than 1.5 wt % $TiO_2$;
    a dopant including at least 0.5 wt % $Nb_2O_5$;
    a porosity no greater than 9.0 vol %; and
    a corrosion rate no greater than 2.69 mm/year at an operating temperature of 1150° C. and a molten glass velocity of 27 cm/min.

2. The refractory object according to claim 1, wherein the glass object is in a form of a glass sheet.

3. The refractory object according to claim 2, wherein the glass sheet has a thickness of at least 20 μm.

4. The refractory object according to claim 2, wherein the glass sheet has a thickness no greater than 5 mm.

5. The refractory object according to claim 4, wherein the glass sheet has a width of at least 0.2 m.

6. The refractory object according to claim 2, wherein the glass object includes an alkali glass.

7. The refractory object according to claim 1, wherein the refractory object has a density of at least 3.55 g/cc.

8. The refractory object of claim 1, wherein a content of the dopant is no greater than 5 wt %.

9. The refractory object of claim 1, wherein at least 1% of the $Al_2O_3$ in the refractory object is provided as reactive $Al_2O_3$.

10. The refractory object of claim 1, wherein no greater than 99% of the $Al_2O_3$ in the refractory object is provided as reactive $Al_2O_3$.

11. The refractory object of claim 1, wherein the corrosion rate is no greater than 1.6 mm/year at an operating temperature of 1150° C. and a molten glass velocity of 27 cm/min.

12. The refractory object of claim 1, wherein the porosity is at least 0.05 vol %.

13. The refractory object of claim 1, wherein the refractory object has a porosity no greater than 9.0 vol %.

14. The refractory object of claim 1, wherein the refractory object has a length of at least 0.5 m.

15. A refractory object used in forming a glass object, the refractory object comprising:
 at least 95 wt % $Al_2O_3$;
 less than 0.05 wt % of $SiO_2$;
 less than 1.5 wt % $TiO_2$;
 at least 0.2 wt % of an oxide of Ta;
 a density of no greater than 3.9 g/cc.

16. The refractory object of claim 15, wherein the refractory object has a porosity no greater than 9.0 vol %.

17. The refractory object of claim 15, wherein at least 1% of the $Al_2O_3$ in the refractory object is provided as reactive $Al_2O_3$.

18. The refractory object of claim 15, wherein no greater than 99% of the $Al_2O_3$ in the refractory object is provided as reactive $Al_2O_3$.

* * * * *